(Model.)

W. H. WILD.
INTERMITTENT FRICTION GRIP.

No. 432,348. Patented July 15, 1890.

ATTEST.
J. Henry Kaiser
A. L. Evans

INVENTOR.
William H. Wild.
Per M. D. Converse
his Attorney.

UNITED STATES PATENT OFFICE.

WILLIAM H. WILD, OF VALATIE, NEW YORK, ASSIGNOR TO THE WILD ENGINEERING COMPANY, OF SAME PLACE.

INTERMITTENT-FRICTION-GRIP.

SPECIFICATION forming part of Letters Patent No. 432,348, dated July 15, 1890.

Application filed July 1, 1889. Serial No. 316,205. (Model.)

*To all whom it may concern:*

Be it known that I, WILLIAM H. WILD, a citizen of the United States, residing at Valatie, in the county of Columbia and State of New York, have invented certain new and useful Improvements in Intermittent Friction-Grips; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in intermittent friction grips or clutches adaptable to shafting, drill-stocks, bit-braces, screwdrivers, auger-handles, &c., and has for its objects the preservation of their accuracy of alignment, instantaneous noiseless rigid interlocking, or right-hand or left-hand intermittent rotation at will without lost motion, and simplicity of construction; and it consists of the combinations and arrangement of mechanisms hereinafter described and shown.

I am aware that friction balls or rollers have long been used in intermittent clutches, grips, and kindred appliances constructed to exert their clamping action parallel to the axis of rotation; but I attain the objects of my invention by supporting the friction-balls in pockets provided in an independent or loose collar for reversing motion and putting in and out of gear and operating them in an annular plane right-angular or radially to the axis of rotation.

To illustrate my invention I have shown its application to a bit-brace in the accompanying drawings, wherein—

Figure 1:
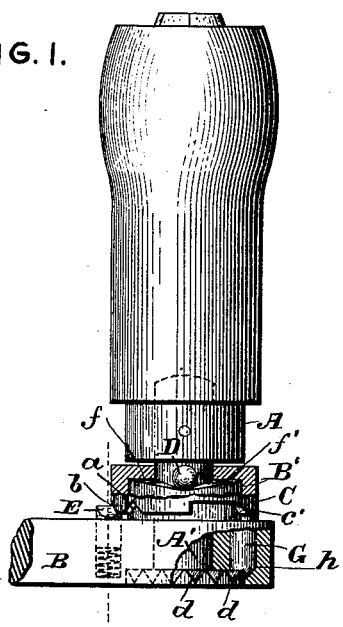
Figure 3:
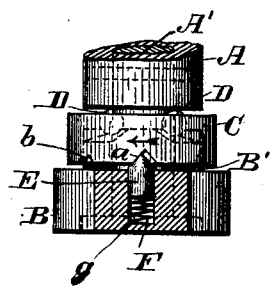
Figure 2:
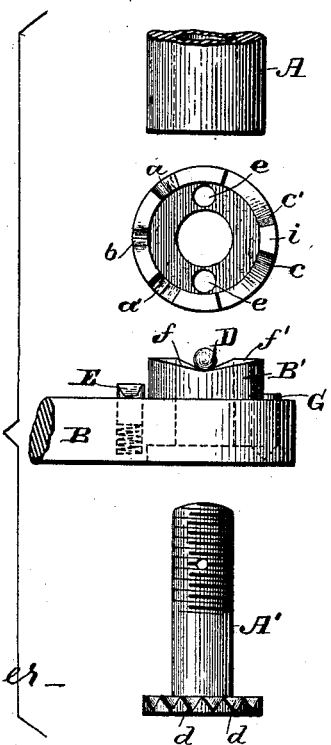
Figure 4:
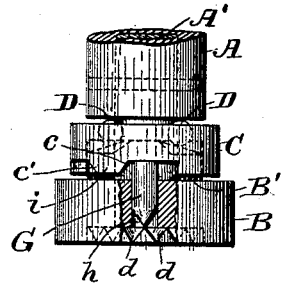
Figure 5:
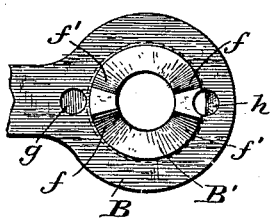

Figure 1 is a side elevation showing the parts assembled, Fig. 2 showing the several parts separated; Fig. 3, a front and partly-sectional view on line $xx$ of Fig. 1; Fig. 4, a rear view, and Fig. 5 a top view, of one of the parts.

Like letters indicate corresponding parts throughout the several figures.

A represents the chuck end of a spindle or shaft to be rotated.

A' is a screw rigidly secured to and forming an extension of A; B, the brace, and B' its hub bored and counterbored to receive the extension-spindle; C, a loose cup-shaped collar; D D, friction-balls; E, a plunger-pin with one end V-shaped; F, a coiled compression-spring; G, a free loose locking-pin with one end cone-shaped. $a$ and $a'$ are V-shaped notches, and $b$ a stop-notch in the rim of the collar, and $c$ and $c'$ beveled surfaces on the same.

$d\ d$ are cone-shaped recesses in the head of the extended spindle.

$e\ e$ are pockets in the collar for receiving the friction-balls, and are of slightly-greater diameter than the balls, the diameter of the latter being greater than the thickness of the bottom of the collar.

$f f$ and $f' f'$ are inclined surfaces on the hub of the brace; $g$, a socket for the plunger-pin and its spring; $h$, the hole in which the coupling or locking pin operates; $i$, a fullness left in the rim of the collar.

The operation of my invention is as follows: The parts being assembled, as shown in Fig. 1, the friction-balls in the pockets $e\ e$ of the collar C rest in the depressions between the inclined surfaces $f f$ and $f' f'$ on the end of the hub B', while the V-point of the plunger-pin E engages the stop-notch $b$, and the cone-shaped end of the locking-pin G engages one of the correspondingly-shaped recesses $d\ d\ d$ on the extended spindle A', and is securely held there by the full portion $i$ of the rim of the collar C. In this position the whole is rigidly coupled to rotate together as one piece in either direction. To obtain a right-hand rotary and left-hand slip motion, turn the collar C in the direction of the arrow in Fig. 3 as far as possible, which brings the friction-balls D D, that are in the pockets $e\ e$ of the collar C, up the corresponding inclines $f' f$ till they are each in contact on opposite sides with the square end or shoulder of the spindle A, in which position they are maintained by the spring F, forcing contact of the beveled side of the plunger-pin E, with one side of the V-shaped notch $a$ in the rim of the collar C. In this position the locking-pin G is free to recede from engagement with the recesses $d\ d\ d$ through shifting of the full portion $i$ of the collar C to one side of it, as shown in Fig. 4, which it does on the first left-hand movement of the brace, being forced back by contact of the inclined walls of the recesses $d$ $d$, with its cone end into the position shown in the same figure. Now turn the hub B to the right, and the balls D D, by wedging between the inclined surfaces $f$ and $f'$ of the hub B and the square end of the spindle A, will revolve the latter in the same direction with the hub B. To obtain a reverse or left-hand rotation and right-hand slip, turn the collar C in the reverse direction to that indicated by the arrow in Fig. 3 as far as possible. The plunger-pin E will then similarly engage the V-shaped notch $a'$, and all parts will bear a corresponding relationship. In this reversing the beveled surface $c$ on the rim of the collar C comes in contact with the locking-pin G and forces it down into one of the recesses $d$ $d$, which its cone end brings round into position, if out of position, by contact with their inclined walls, and which it again is free to recede from, and does, as before, by being uncovered as the full part $i$ of the collar C passes over to the other side of it. In either right or left hand position the grip and slip each are instantaneous, noiseless, and without lost motion or straining or cramping of alignment along the axis of rotation.

Having described my invention, what I claim as new, and desire to secure by Letters Patent, is—

1. In an intermittent friction-grip, the loose independent collar C, provided with pockets $e$ $e$, and balls D D, inserted in said pockets loosely, substantially as and for the purposes shown and described.

2. In an intermittent friction-grip, the reversing device consisting of one or more friction-balls D to operate loosely in pockets $e$ in a loose collar C, in combination with opposed inclined surfaces $f$ and $f'$ on the end of one of the parts to be rotated, substantially as shown and described.

3. In an intermittent friction-grip, the device interposed between abutting ends or shoulders of parts having a common axis of rotation and at right angles thereto, consisting of a loose collar C, provided with one or more pockets $e$ $e$, carrying friction-balls D D, and having V-shaped notches $a$ and $a'$ in its rim, in combination with a loose plunger-pin E, with V-point supported on a spring F in a socket $g$, substantially as and for the purposes shown and described.

4. In an intermittent grip, the interlocking device herein described, consisting of inclined surfaces $c$ and $c'$ on the rim of a collar C, a free loose pin G, with cone-shaped end, in combination with recesses $d$ $d$ in one of the parts to be rotated, adapted to automatically unlock when set for intermittent rotation, substantially as and for the purposes shown and described.

In testimony whereof I affix my signature in presence of two witnesses.

WILLIAM H. WILD.

Witnesses:
ALFRED WILD,
EDWIN M. FOX.